United States Patent
Wang et al.

(10) Patent No.: US 10,822,261 B1
(45) Date of Patent: Nov. 3, 2020

(54) CARBON REMOVAL AND DENITRIFICATION TREATMENT DEVICE FOR LEACHATE FROM WASTE INCINERATION PLANT AND METHOD THEREOF

(71) Applicant: TONGJI UNIVERSITY, Shanghai (CN)

(72) Inventors: Yayi Wang, Shanghai (CN); Chao Liu, Shanghai (CN); Zhe Zhang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 16/684,472

(22) Filed: Nov. 14, 2019

(30) Foreign Application Priority Data

Aug. 8, 2019 (CN) .......................... 2019 1 0729818

(51) Int. Cl.
| | | |
|---|---|---|
| *C02F 9/00* | (2006.01) | |
| *C02F 1/44* | (2006.01) | |
| *C02F 3/30* | (2006.01) | |
| *C02F 1/00* | (2006.01) | |

(52) U.S. Cl.
CPC ................ *C02F 9/00* (2013.01); *C02F 1/442* (2013.01); *C02F 1/444* (2013.01); *C02F 3/303* (2013.01); *C02F 3/307* (2013.01); *C02F 2001/007* (2013.01); *C02F 2301/046* (2013.01)

(58) Field of Classification Search
CPC .. C02F 9/00; C02F 3/303; C02F 3/307; C02F 2001/007; C02F 1/442; C02F 1/444; C02F 2301/046

USPC ....... 210/605, 621, 622, 630, 650, 652, 252, 210/259, 903, 908
See application file for complete search history.

(56) References Cited

U.S. PATENT DOCUMENTS

| | | | |
|---|---|---|---|
| 2006/0249449 A1* | 11/2006 | Nakhla ................ | C02F 3/1273 210/605 |
| 2012/0012525 A1* | 1/2012 | Kuang ..................... | C02F 9/00 210/605 |
| 2013/0264280 A1* | 10/2013 | Zhao ....................... | C02F 3/307 210/605 |
| 2015/0353397 A1* | 12/2015 | Cath ...................... | C02F 3/1263 210/195.1 |
| 2018/0009687 A1* | 1/2018 | Murthy ................... | C02F 3/006 |
| 2018/0179092 A1* | 6/2018 | Yoshikawa ............. | C02F 3/307 |
| 2018/0297879 A1* | 10/2018 | Cho ........................ | C02F 3/307 |
| 2019/0084858 A1* | 3/2019 | Huo ......................... | C02F 9/00 |

(Continued)

FOREIGN PATENT DOCUMENTS

JP          6241525 B1 * 12/2017

*Primary Examiner* — Fred Prince
(74) *Attorney, Agent, or Firm* — JCIP Global Inc.

(57) ABSTRACT

A carbon removal and denitrification treatment device for a leachate from a waste incineration plant includes a pretreatment unit, an anaerobic reactor, a nitrification cycle unit, an anaerobic ammonium oxidation cycle unit and an NF membrane filter that are sequentially communicated. A denitrification cycle assembly is disposed between the nitrification cycle unit and the anaerobic ammonium oxidation cycle unit. When the leachate is treated, the leachate is pretreated by the pretreatment unit to successively enter the anaerobic reactor, the nitrification cycle unit and the anaerobic ammonium oxidation cycle unit for carbon removal and denitrification.

10 Claims, 1 Drawing Sheet

(56) References Cited

U.S. PATENT DOCUMENTS

2019/0100452 A1\* 4/2019 Christensson ............ C02F 3/30
2020/0079669 A1\* 3/2020 Kim ....................... C02F 3/121

\* cited by examiner

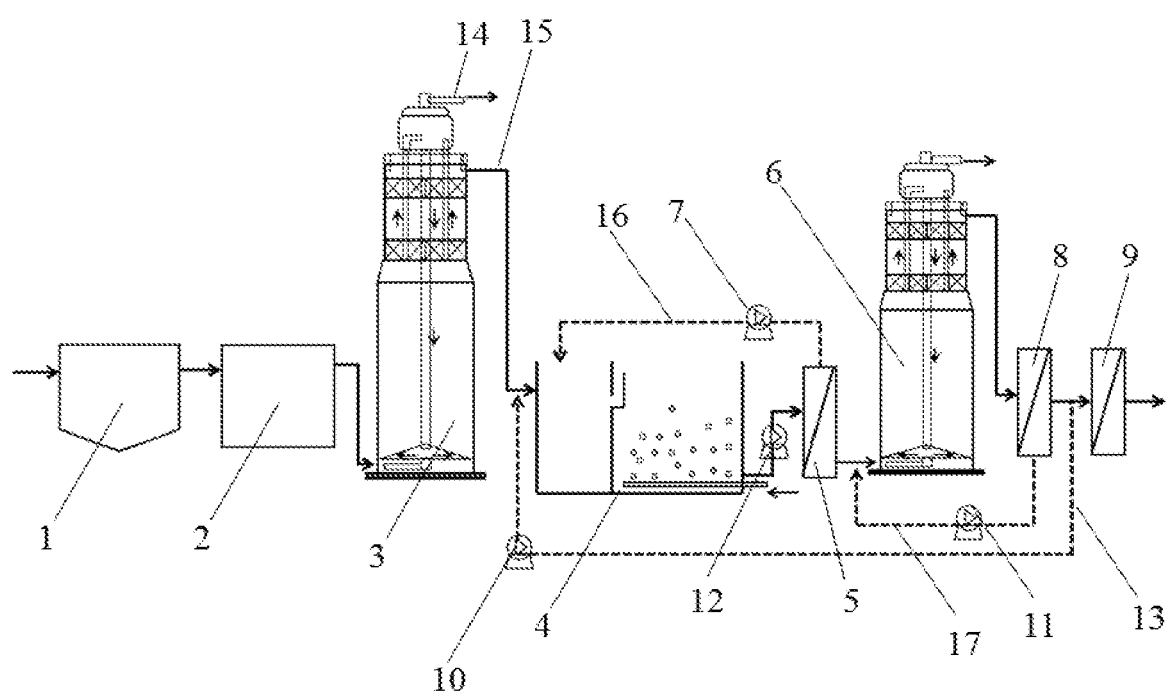

CARBON REMOVAL AND DENITRIFICATION TREATMENT DEVICE FOR LEACHATE FROM WASTE INCINERATION PLANT AND METHOD THEREOF

CROSS-REFERENCE TO RELATED APPLICATION

This application claims the priority benefits to China Patent Application serial No. 201910729818.X, filed on Aug. 8, 2019. The entirety of the above-mentioned patent application is hereby incorporated by reference herein and made a part of this specification.

BACKGROUND

Technical Field

The present invention belongs to the technical field of biological treatment of high organic matter and high ammonia nitrogen wastewater, in particular, to a carbon removal and denitrification treatment device for the leachate from waste incineration plant and a method thereof.

Description of Related Art

With the development of China's economy, the scale of cities is expanding, urban land is becoming increasingly tense, and the disposal method of domestic landfill is gradually reduced due to the occupant area and other reasons, so that the requirements for the reduction and resource utilization of waste incineration have become more prominent, and as a substitution, more and more waste incineration treatments emerge. During the operation of the waste incineration plant, a large amount of "fresh" landfill leachate is produced, which is a large amount of high organic matter and high ammonia nitrogen wastewater generated during the fermentation pretreatment process before waste incineration, and characterized by large changes in water quality and quantity, high concentration of organic matter, high ammonia nitrogen content, high inorganic salt content, high heavy metal content, and imbalance of nutrient elements.

As a typical high ammonia nitrogen high organic wastewater, the treatment of landfill leachate in waste incineration plant, especially the low-energy denitrification problem, has always been a difficult point in the research and discussion for the field of the world water treatment. The treatment process of landfill leachate in waste incineration plant usually adopts a combined process of anaerobic+nitrification denitrification+UF membrane filtration+NF membrane filtration+RO filtration. This process has many problems such as large investment cost, high operation energy consumption, large sludge output, low stability for biochemical system effluent, and limited efficiency in TN removal. And, other physical and chemical treatment processes have disadvantages such as many equipment, frequent failures, and inability to operate continuously.

Therefore, how to treat the landfill leachate efficiently and energy-efficiently, and how to develop corresponding high-efficiency biological treatment process or low-cost physical and chemical treatment processes are of great significance.

SUMMARY

The purpose of the present invention is to provide a carbon removal and denitrification treatment device for a leachate from a waste incineration plant and a method thereof to overcome defects in the prior art.

The purpose of the present may be realized by the following technical solutions.

A carbon removal and denitrification treatment device for a leachate from a waste incineration plant comprises a pretreatment unit, an anaerobic reactor, a nitrification cycle unit, an anaerobic ammonium oxidation cycle unit and an NF membrane filter that are sequentially communicated with each other. The nitrification cycle unit includes an A/O reactor in communication with the anaerobic reactor, and the anaerobic ammonium oxidation cycle unit includes an anaerobic ammonium oxidation reactor in communication with the nitrification cycle unit. A denitrification cycle assembly is disposed between an inlet end of the A/O reactor and an outlet end of the anaerobic ammonium oxidation cycle unit, and the inlet end of the A/O reactor is in communication with the outlet end of the anaerobic ammonium oxidation cycle unit through the denitrification cycle assembly.

The present invention proposes a device for processing a landfill leachate from the waste incineration plant and a method thereof through anaerobic-short-range nitrification-external UF membrane filtration-anaerobic ammonium oxidation-external UF membrane filtration-NF membrane filtration process. Specifically, after the leachate from the waste incineration plant is adjusted and pretreated by the pretreatment unit to remove sediment, first, in the anaerobic reactor, an anaerobic process is used for primary decarburization and for generating biogas energy. Then, the A/O process is used for secondary decarburization and short-range nitrification in the nitrification cycle unit to convert about 50% of ammonia nitrogen in the leachate to nitrite in nitrous state. And then, an anaerobic ammonium oxidation process is used for further removal of ammonia nitrogen from the leachate in the anaerobic ammonium oxidation cycle unit to repeatedly treat the leachate by the cycle assembly. Finally, the NF membrane filter is used for further filtration to enable the effluent to meet the standard discharge or recovery, thereby achieving efficient and stable treatment of high organic matter and high ammonia nitrogen wastewater.

The present invention is directed to the leachate produced by the waste incineration plant, having high COD and a removal efficiency for nitrogen and may produce biogas energy that may be recycled, so that the energy consumption during the treatment is reduced, no additional carbon source is needed in the denitrification process, and the amount of excess sludge generated is low.

Further, the pretreatment unit includes a sedimentation tank, and a conditioning tank disposed between the sedimentation tank and the anaerobic reactor.

The leachate is first passed through the sedimentation tank to remove suspended solids from the water by natural precipitation or coagulation precipitation. Then, through the conditioning tank, the water quantity and water quality are adjusted and equalized to ensure the balance and stability of the water and water quality of the subsequent biochemical treatment system. A pre-aeration system may be provided in the conditioning tank for oxygenation and agitation to prevent the precipitation and stinking of suspended particles in the sewage, and further has a certain degradation effect on the organic matter in the sewage while improving the impact resistance and treatment effect of the entire system.

As a preferred technical solution, the sedimentation tank is provided with a sand removing component. The sand removing component may be a grid well for removing soft wraps, large solid particles and floating objects in the leachate, thereby protecting the service life of subsequent operation pumps or other components and reducing the system's processing workload.

As a preferred technical solution, a top of the anaerobic reactor is provided with a biogas outlet pipe and an anaerobic reactor outlet end in communication with the nitrification cycle unit.

The anaerobic reactor is used to remove an organic matter from the leachate and produce a biogas. The biogas is connected to an external biogas recovery system through the biogas outlet pipe for the recovery of the biogas.

As a preferred technical solution, a bottom of the anaerobic reactor is provided with a steam heating component and a temperature control component, and an upper part of the anaerobic reactor is provided with an upper-layer three-phase separator and a lower-layer three-phase separator. The steam heating component is used to adjust the temperature of the anaerobic reactor by using a steam heat source to maintain anaerobic microorganisms in the anaerobic reactor within an optimal growth temperature range. The temperature control unit is used to control the dosage of the above steam heat source. The three-phase separator is used to separate the sludge and water accompanying the biogas after the biogas is produced in the anaerobic reactor, so as to separate the biogas in the anaerobic reactor for removing and separating sludge solids and water from therein.

Further, the nitrification cycle unit further includes a nitrification UF membrane filter disposed between the A/O reactor and the anaerobic ammonium oxidation cycle unit, a nitrification cycle line disposed between an outlet end of the nitrification UF membrane filter and the A/O reactor, and a nitrification cycle pump disposed on the nitrification cycle line.

The A/O reactor includes an A tank and an O tank that are in communication with each other. The leachate is subjected to denitrification and short-range nitrification through the A tank and the O tank, respectively, to further remove residual organic matter, and a low energy consumption is achieved by controlling the biological reaction conditions, so that the ratio of ammonia nitrogen to nitrosamine in the leachate is adjusted by biological action to achieve the conditions for anaerobic ammonium oxidation.

As a preferred technical solution, the O tank is provided with a foldback and a hole. By providing the foldback and the hole in the O tank, the hydraulic flow in the tank is improved to avoid short-flow phenomenon.

As a preferred technical solution, the O tank is provided with a nitrite online monitoring instrument, which monitors the nitrite nitrogen in real time to further control the specific process of the reaction.

As a preferred technical solution, a bottom of the O tank is provided with a vent pipe.

The nitrification UF membrane filter mainly plays a role of interception, and is used for separation between soil and water after short-range nitrification treatment, thereby realizing stable operation of the nitrification cycle unit.

As a preferred technical solution, a fluid pump is provided between an outlet end of the A/O reactor and an inlet end of the nitrification UF membrane filter for conveying the product of the A/O reactor to the UF membrane filter.

The nitrification cycle pump drives the material at the outlet of the nitrification UF membrane filter to flow back to the A tank of the A/O reactor to further reduce residual ammonia nitrogen and nitrate.

Further, the anaerobic ammonium oxidation cycle unit further includes an anaerobic ammonium oxidation UF membrane filter disposed between the anaerobic ammonium oxidation reactor and the NF membrane filter, and the anaerobic ammonium oxidation UF membrane filter is provided with an inlet end in communication with the anaerobic ammonium oxidation reactor, a clear liquid outlet end in communication with the NF membrane filter, and a concentrated liquid outlet end. An anaerobic ammonium oxidation cycle line is disposed between the concentrated liquid outlet end and an inlet end of the anaerobic ammonium oxidation reactor, the anaerobic ammonium oxidation cycle line is provided with an anaerobic ammonia oxidation cycle pump, and the anaerobic ammonium oxidation reactor is in communication with the nitrification UF membrane filter.

The material treated by the nitrification cycle unit enters the anaerobic ammonium oxidation reactor, so that the total nitrogen removal process without additional energy consumption is realized by the anaerobic ammonium oxidization bacteria with the nitrite in the material and the residual ammonia nitrogen used as the matrix. Then, the interception role played by the anaerobic ammonium oxidation UF membrane filter is used for separation between the soil and water after the anaerobic ammonium oxidation treatment, so as to achieve stable operation of the anaerobic ammonium oxidation cycle unit.

The anaerobic ammonium oxidation cycle pump drives the concentrated liquid discharged from the concentrated liquid outlet end of the anaerobic ammonium oxidation UF membrane filter to flow back to the inlet end of the anaerobic ammonia oxidation reactor to further increase the removal rate for the nitrogen.

Further, the denitrification cycle assembly includes a nitrogen removal circulation line that communicates with an inlet end of the nitrification cycle unit and the outlet end of the anaerobic ammonium oxidation cycle unit, and a denitrification cycle pump disposed on the denitrification cycle line. Residual ammonia nitrogen and nitrate are further removed by cycling.

A carbon removal and denitrification treatment method for a leachate based on the above device comprises following steps.

1) Pre-treating the leachate in the pretreatment unit to obtain a pre-treated leachate.

2) Introducing the pretreated leachate into the anaerobic reactor to remove an organic matter to obtain an anaerobic-reacted leachate, and generate a biogas.

3) Introducing the anaerobic-reacted leachate into the nitrification cycle unit to remove the residual organic matter, and adjusting a ratio of an ammonia nitrogen to a nitrite in the leachate.

4) Cycling a part of an outlet material of the nitrification cycle unit back to the A/O reactor, and cycling the other part back to the anaerobic ammonium oxidation cycle unit to remove the ammonia nitrogen.

5) Cycling a part of an outlet material of the anaerobic ammonium oxidation cycle unit back to the inlet end of the anaerobic ammonium oxidation cycle unit, and cycling the other part back to the inlet end of the A/O reactor, and filtering the rest through the NF membrane filter for discharging.

Further, in the anaerobic reactor, a HRT is 5-12 d, a temperature is 33-37° C., a MLSS is 8-18 g/L, and a pH is 7.5-8.5.

Among them, HRT is the hydraulic retention time, which refers to an average retention time of the leachate in the reactor, that is, the average reaction time of the leachate functioning with the microorganism in the bioreactor.

MLSS is the mixed liquid suspension solid concentration, that is, the total weight of the activated sludge solids contained in the mixed liquid per unit volume.

Further, the A/O reactor includes an A tank and an O tank that are in communication with each other, and in the A tank, a HRT is 6-12 h, a pH is 7.0-8.5, a temperature is 30-37° C., a DO is 0.2-1.0 mg/L, and a MLSS is 10-30 g/L. In the O tank, a HRT is 3-6 d, a pH is 7.0-8.5, a temperature is 30-37° C., a DO is 1-4 mg/L, a MLSS is 10-30 g/L, and a TN is 45%-55%, a ratio of nitrite to ammonia nitrogen in the outlet material of the nitrification cycle unit being 0.8-1.1:1.

Among them, TN is the total nitrogen content, that is, the total content of various forms of inorganic and organic nitrogen in water.

DO is the dissolved oxygen content in water.

Further, a reflux ratio of the cycling to the A/O reactor in the outlet material of the nitrification cycle unit is 500-1000%, a reflux ratio of the cycling to the inlet end of the anaerobic ammonium oxidation cycle unit in the outlet material of the anaerobic ammonium oxidation cycle unit is 500-1000%, and a reflux ratio of the cycling to the A/O reactor in the outlet material of the anaerobic ammonium oxidation cycle unit is 100-150%.

The reflux ratio is the volume ratio of a cycled material to a material entering the next component that is described as follows.

For the reflux ratio of the cycling to the A/O reactor in the outlet material of the nitrification cycle unit, it is the volume ratio of the material leaving from the nitrification UF membrane filter and cycling back to the A/O reactor to the material leaving from the nitrification UF membrane filter and entering the anaerobic ammonium oxidation reactor.

For the reflux ratio of the cycling to the inlet end of the anaerobic ammonium oxidation cycle unit in the outlet material of the anaerobic ammonium oxidation cycle unit, it is the volume ratio of the material leaving from the anaerobic ammonium oxidation UF membrane filter and cycling back to the anaerobic ammonium oxidation reactor to the material leaving from the anaerobic ammonium oxidation UF membrane filter and entering the NF membrane filter.

For the reflux ratio of the cycling to the A/O reactor in the outlet material of the anaerobic ammonium oxidation cycle unit, it is the volume ratio of the material leaving from the anaerobic ammonium oxidation UF membrane filter and cycling back to the A/O reactor to the material leaving from the anaerobic ammonium oxidation UF membrane filter and entering the NF membrane filter.

Further, in the anaerobic ammonium oxidation reactor, a SRT is 6-15 d, a MLSS is 8-20 g/L, and a temperature is 30-37° C.

Among them, SRT is the retention time of the sludge.

Technical principle: For the low-cost and high-efficiency carbon removal and denitrification treatment device for the leachate from the waste incineration plant, first, the landfill leachate of the waste incineration plant is conditioned and pretreated, and the conditioned and pretreated leachate is first introduced into the anaerobic reactor to remove organic matter and condition the water quality to produce biogas, wherein the removal rate of COD is about 75-95%. The anaerobic-reacted leachate is introduced into the nitrification cycle unit, and denitrification and short-range nitrification are achieved by controlling A/O process parameters for further removal of residue organic matters, and then a biological action is used to adjust the ratio of ammonia nitrogen to nitrous oxide in the leachate with lower energy consumption by controlling the biological reaction conditions to achieve the conditions that may achieve anaerobic ammonium oxidation, further, the interception role played by the anaerobic ammonium oxidation UF membrane filter is used for separation between the soil and water after the nitrification treatment so as to achieve stable operation of the nitrification system. For the nitrified leachate, one part is refluxed to the A/O reactor and one part is introduced into the anaerobic ammonium oxidation reactor, and the ammonium nitrogen removal process without additional energy consumption is realized by the anaerobic ammonium oxidization bacteria with the nitrified nitrite and residual ammonia nitrogen as matrix. After being treated by anaerobic ammonium oxidation UF membrane filter, one part of the leachate is refluxed to A/O reactor and anaerobic ammonia oxidation reactor for further reducing residual ammonia nitrogen and nitrate, and the other part is followed by an external NF filtration system, so as to achieve efficient and stable treatment for the wastewater with high organic matter and high ammonia nitrogen.

Compared with the prior art, the present invention has the following characteristics.

1) In the present invention, effective removal of organic matter from ammonia nitrogen may be achieved, and the effective denitrification of the leachate in the waste incineration plant is realized, while improving the operating efficiency of the bioreactor through removing the organic matter and generating biogas by the anaerobic reactor, the internal circulation between the nitrification cycle unit and the anaerobic ammonium oxidation cycle unit, and the outer circulation between the nitrification cycle unit and the anaerobic ammonium oxidation cycle unit.

2) The present invention has low consumption and high efficiency, and saves 50% of electric energy consumption as compared with the traditional carbon removal and denitrification process for the leachate.

3) In the present invention, through the nitrification UF membrane filter and the anaerobic ammonium oxidation UF membrane filter, the microbial interception efficiency of the anaerobic ammonium oxidation reactor may be effectively improved, which provides a basis for the rapid initiation of the system.

4) In the present invention, through the use of anaerobic technology, the amount of sludge and waste generated during the treatment of leachate is effectively reduced.

5) In the present invention, by setting up an online nitrite monitoring system in a short-range nitrification tank, the progress of the reactor may be monitored in real time, providing a basis for fine-tuning short-range nitrification reactions.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 1 is a structural view of a carbon removal and denitrification treatment device for a leachate from a waste incineration plant according to the present invention.

DESCRIPTION OF THE EMBODIMENTS

The present invention will be elaborated hereafter in connection with the drawings and specific embodiments.

The present embodiment is implemented on the premise of the technical solution of the present invention, and detailed implementation and specific operation procedures are given, but the scope of protection of the present invention is not limited to the following embodiments.

Embodiment 1

A carbon removal and denitrification treatment device for a leachate from a waste incineration plant shown in FIG. 1 comprises a pretreatment unit, an anaerobic reactor 3, a nitrification cycle unit, an anaerobic ammonium oxidation cycle unit and an NF membrane filter 9 that are sequentially communicated with each other. The nitrification cycle unit includes an A/O reactor 4 in communication with the anaerobic reactor 3, and the anaerobic ammonium oxidation cycle unit includes an anaerobic ammonium oxidation reactor in communication with the nitrification cycle unit 6. A denitrification cycle assembly is disposed between an inlet end of the A/O reactor 4 and an outlet end of the anaerobic ammonium oxidation cycle unit, and the inlet end of the A/O reactor 4 is in communication with the outlet end of the anaerobic ammonium oxidation cycle unit through the denitrification cycle assembly.

The present invention proposes a device for processing a landfill leachate from the waste incineration plant and a method thereof through anaerobic-short-range nitrification-external UF membrane filtration-anaerobic ammonium oxidation-external UF membrane filtration-NF membrane filtration process. Specifically, after the leachate from the waste incineration plant is adjusted and pretreated by the pretreatment unit to remove sediment, first, in the anaerobic reactor 3, an anaerobic process is used for primary decarburization and for generating a biogas energy. Then, the A/O process is used for secondary decarburization and short-range nitrification in the nitrification cycle unit to convert about 50% of ammonia nitrogen in the leachate to nitrite in nitrous state. And then, an anaerobic ammonium oxidation process is used for further removal of ammonia nitrogen from the leachate in the anaerobic ammonium oxidation cycle unit to repeatedly treat the leachate by the cycle assembly. Finally, the NF membrane filter 9 is used for further filtration to enable the effluent to meet the standard discharge or recovery, thereby achieving efficient and stable treatment of high organic matter and high ammonia nitrogen wastewater.

The present invention is directed to the leachate produced by the waste incineration plant, having high COD and a removal efficiency for nitrogen and may produce biogas energy that may be recycled, so that the energy consumption during the treatment is reduced, no additional carbon source is needed in the denitrification process, and the amount of excess sludge generated is low.

The pretreatment unit includes a sedimentation tank 1, and a conditioning tank 2 disposed between the sedimentation tank 1 and the anaerobic reactor 3.

The leachate is first passed through the sedimentation tank 1 to remove suspended solids from the water by natural precipitation or coagulation precipitation. Then, through the conditioning tank 2, the water quantity and water quality are adjusted and equalized to ensure the balance and stability of the water and water quality of the subsequent biochemical treatment system. A pre-aeration system may be provided in the conditioning tank 2 for oxygenation and agitation to prevent the precipitation and stinking of suspended particles in the sewage, and further has a certain degradation effect on the organic matter in the sewage while improving the impact resistance and treatment effect of the entire system.

The sedimentation tank 1 is provided with a sand removing component. The sand removing component may be a grid well for removing soft wraps, large solid particles and floating objects in the leachate, thereby protecting the service life of subsequent operation pumps or other components and reducing the system's processing workload.

A top of the anaerobic reactor 3 is provided with a biogas outlet pipe 14 and an anaerobic reactor outlet end 15 in communication with the nitrification cycle unit.

The anaerobic reactor 3 is used to remove an organic matter from the leachate and produce a biogas. The biogas is connected to an external biogas recovery system through the biogas outlet pipe 14 for the recovery of the biogas.

A bottom of the anaerobic reactor 3 is provided with a steam heating component and a temperature control component, and an upper part of the anaerobic reactor 3 is provided with an upper-layer three-phase separator and a lower-layer three-phase separator.

The nitrification cycle unit further includes a nitrification UF membrane filter 5 disposed between the A/O reactor 4 and the anaerobic ammonium oxidation cycle unit, a nitrification cycle line 16 disposed between an outlet end of the nitrification UF membrane filter 5 and the A/O reactor 4, and a nitrification cycle pump 7 disposed on the nitrification cycle line 16.

The A/O reactor 4 includes an A tank and an O tank that are in communication with each other, which are subjected to denitrification and short-range nitrification, respectively, to further remove residual organic matter, and a low energy consumption is achieved by controlling the biological reaction conditions, so that the ratio of ammonia nitrogen to nitrosamine in the leachate is adjusted by biological action to achieve the conditions for anaerobic ammonium oxidation.

The O tank is provided with a foldback and a hole.

The O tank is provided with a nitrite online monitoring instrument, which monitors the nitrite nitrogen in real time to further control the specific process of the reaction.

A bottom of the O tank is provided with a vent pipe.

The nitrification UF membrane filter 5 mainly plays a role of interception, and is used for separation between soil and water after short-range nitrification treatment, thereby realizing stable operation of the nitrification cycle unit.

A fluid pump 12 is provided between an outlet end of the A/O reactor 4 and an inlet end of the nitrification UF membrane filter 5 for conveying the product of the A/O reactor 4 to the UF membrane filter.

The nitrification cycle pump 7 drives the material at the outlet of the nitrification UF membrane filter 5 to flow back to the A tank of the A/O reactor 4 to further reduce residual ammonia nitrogen and nitrate.

The anaerobic ammonium oxidation cycle unit further includes an anaerobic ammonium oxidation UF membrane filter 8 disposed between the anaerobic ammonium oxidation reactor 6 and the NF membrane filter 9, and the anaerobic ammonium oxidation UF membrane filter 8 is provided with an inlet end in communication with the anaerobic ammonium oxidation reactor 6, a clear liquid outlet end in communication with the NF membrane filter 9, and a concentrated liquid outlet end. An anaerobic ammonium oxidation cycle line 17 is disposed between the concentrated liquid outlet end and an inlet end of the anaerobic ammonium oxidation reactor 6, the anaerobic ammonium oxidation cycle line 17 is provided with an anaerobic ammonia oxidation cycle pump 11, and the anaerobic ammonium oxidation reactor 6 is in communication with the nitrification UF membrane filter 5.

The material treated by the nitrification cycle unit enters the anaerobic ammonium oxidation reactor 6, so that the total nitrogen removal process without additional energy consumption is realized by the anaerobic ammonium oxidization bacteria with the nitrite in the material and the residual ammonia nitrogen used as the matrix. Then, the interception role played by the anaerobic ammonium oxidation UF membrane filter 8 is used for separation between the soil and water after the anaerobic ammonium oxidation treatment, so as to achieve stable operation of the anaerobic ammonium oxidation cycle unit.

The anaerobic ammonium oxidation cycle pump 11 drives the concentrated liquid discharged from the concentrated liquid outlet end of the anaerobic ammonium oxidation UF membrane filter 8 to flow back to the inlet end of the anaerobic ammonia oxidation reactor 6 to further increase the removal rate for the nitrogen.

The denitrification cycle assembly includes a nitrogen removal circulation line 13 that communicates with an inlet end of the nitrification cycle unit and the outlet end of the anaerobic ammonium oxidation cycle unit, and a denitrification cycle pump 10 disposed on the denitrification cycle line 13. Residual ammonia nitrogen and nitrate are further removed by cycling.

A carbon removal and denitrification treatment method for a leachate based on the above device comprises following steps.

1) Pre-treating the leachate in the pretreatment unit to obtain a pre-treated leachate.

2) Introducing the pretreated leachate into the anaerobic reactor 3 to remove an organic matter to obtain an anaerobic-reacted leachate, and generate a biogas.

3) Introducing the anaerobic-reacted leachate into the nitrification cycle unit to remove the residual organic matter, and adjusting a ratio of an ammonia nitrogen to a nitrite in the leachate.

4) Cycling a part of an outlet material of the nitrification cycle unit back to the A/O reactor 4, and cycling the other part back to the anaerobic ammonium oxidation cycle unit to remove the ammonia nitrogen.

5) Cycling a part of an outlet material of the anaerobic ammonium oxidation cycle unit back to the inlet end of the anaerobic ammonium oxidation cycle unit, and cycling the other part back to the inlet end of the A/O reactor 4, and filtering the rest through the NF membrane filter 9 for discharging.

In the anaerobic reactor 3, a HRT is 5 d, a temperature is 33, a MLSS is 8 g/L, and a pH is 7.5.

The A/O reactor 4 includes an A tank and an O tank that are in communication with each other, and in the A tank, a HRT is 6 h, a pH is 7.0, a temperature is 30° C., a DO is 0.2 mg/L, and a MLSS is 10 g/L. In the O tank, a HRT is 3 d, a pH is 7.0, a temperature is 30° C., a DO is 1 mg/L, a MLSS is 10 g/L, and a TN is 45%, a ratio of nitrite to ammonia nitrogen in the outlet material of the nitrification cycle unit being 0.8:1.

A reflux ratio of the cycling to the A/O reactor 4 in the outlet material of the nitrification cycle unit is 500, a reflux ratio of the cycling to the inlet end of the anaerobic ammonium oxidation cycle unit in the outlet material of the anaerobic ammonium oxidation cycle unit is 500, and a reflux ratio of the cycling to the A/O reactor 4 in the outlet material of the anaerobic ammonium oxidation cycle unit is 100%.

In the anaerobic ammonium oxidation reactor 6, a SRT is 6 d, a MLSS is 8 g/L, and a temperature is 30° C.

Technical principle is described as follows. For the low-cost and high-efficiency carbon removal and denitrification treatment device for the leachate from the waste incineration plant, first, the landfill leachate of the waste incineration plant is conditioned and pretreated, and the conditioned and pretreated leachate is first introduced into the anaerobic reactor 3 to remove organic matter and condition the water quality to produce biogas, wherein the removal rate of COD is about 75-95%. The anaerobic-reacted leachate is introduced into the nitrification cycle unit, and denitrification and short-range nitrification are achieved by controlling A/O process parameters for further removal of residue organic matters, and then a biological action is used to adjust the ratio of ammonia nitrogen to nitrous oxide in the leachate with lower energy consumption by controlling the biological reaction conditions to achieve the conditions that may achieve anaerobic ammonium oxidation, further, the interception role played by the anaerobic ammonium oxidation UF membrane filter 5 is used for separation between the soil and water after the nitrification treatment so as to achieve stable operation of the nitrification system. For the nitrified leachate, one part is refluxed to the A/O reactor and one part is introduced into the anaerobic ammonium oxidation reactor 6, and the ammonium nitrogen removal process without additional energy consumption is realized by the anaerobic ammonium oxidization bacteria with the nitrified nitrite and residual ammonia nitrogen as matrix. After being treated by anaerobic ammonium oxidation UF membrane filter 8, one part of the leachate is refluxed to A/O reactor and anaerobic ammonia oxidation reactor 6 for further reducing residual ammonia nitrogen and nitrate, and the other part is followed by an external NF filtration system, so as to achieve efficient and stable treatment for the wastewater with high organic matter and high ammonia nitrogen.

Embodiment 2

In the present embodiment, in the anaerobic reactor 3, a HRT is 6 d, a temperature is 35° C., a MLSS is 12 g/L, and a pH is 8.

The A/O reactor 4 includes an A tank and an O tank that are in communication with each other, and in the A tank, a HRT is 8 h, a pH is 8, a temperature is 35° C., a DO is 0.8 mg/L, and a MLSS is 20 g/L. In the O tank, a HRT is 4 d, a pH is 8, a temperature is 35° C., a DO is 2 mg/L, a MLSS is 15 g/L, and a TN is 50%, a ratio of nitrite to ammonia nitrogen in the outlet material of the nitrification cycle unit being 0.9:1.

A reflux ratio of the cycling to the A/O reactor 4 in the outlet material of the nitrification cycle unit is 800%, a reflux ratio of the cycling to the inlet end of the anaerobic ammonium oxidation cycle unit in the outlet material of the anaerobic ammonium oxidation cycle unit is 800%, and a reflux ratio of the cycling to the A/O reactor 4 in the outlet material of the anaerobic ammonium oxidation cycle unit is 120%.

In the anaerobic ammonium oxidation reactor 6, a SRT is 8 d, a MLSS is 12 g/L, and a temperature is 35° C.

The rest are the same as in Embodiment 1.

Embodiment 3

In the present embodiment, in the anaerobic reactor 3, a HRT is 12 d, a temperature is 37° C., a MLSS is 18 g/L, and a pH is 8.5.

The A/O reactor 4 includes an A tank and an O tank that are in communication with each other, and in the A tank, a HRT is 12 h, a pH is 8.5, a temperature is 37° C., a DO is 1.0 mg/L, and a MLSS is 30 g/L. In the O tank, a HRT is 6 d, a pH is 8.5, a temperature is 37° C., a DO is 4 mg/L, a MLSS is 30 g/L, and a TN is 55%, a ratio of nitrite to ammonia nitrogen in the outlet material of the nitrification cycle unit being 1.1:1.

A reflux ratio of the cycling to the A/O reactor 4 in the outlet material of the nitrification cycle unit is 1000%, a reflux ratio of the cycling to the inlet end of the anaerobic ammonium oxidation cycle unit in the outlet material of the anaerobic ammonium oxidation cycle unit is 1000%, and a reflux ratio of the cycling to the A/O reactor 4 in the outlet material of the anaerobic ammonium oxidation cycle unit is 150%.

In the anaerobic ammonium oxidation reactor 6, a SRT is 15 d, a MLSS is 20 g/L, and a temperature is 37° C.

The rest are the same as in Embodiment 1.

Embodiment 4

In the system for processing the landfill leachate from the waste incineration plant through anaerobic-short-range nitrification-external UF membrane filtration-anaerobic ammonium oxidation-external UF membrane filtration-NF membrane filtration process, the sedimentation tank 1, the conditioning tank 2, the anaerobic reactor 3, the A/O reactor 4, the nitrification UF membrane filter 5, the anaerobic ammonium oxidation reactor 6, the anaerobic ammonium oxidation UF membrane filter 8 and the NF Membrane filter 9 are in communication with each other in turn.

For the specific implementation of the present invention, the landfill leachate of the waste incineration plant is collected to be conditioned and pretreated, and the conditioned and pretreated leachate is first introduced into the anaerobic reactor 3 to condition the water quality to produce biogas for removing the organic matter in the water. The anaerobic-reacted leachate is controlled through anoxic-aerobic process for achieving denitrification and short-range nitrification for further removal of residue organic matters, and then a biological action is used to adjust the ratio of ammonia nitrogen to nitrous oxide in the leachate with lower energy consumption by controlling the biological reaction conditions to achieve the conditions that may achieve anaerobic ammonium oxidation, further, the interception role played by the anaerobic ammonium oxidation UF membrane filter 5 is used for separation between the soil and water after the nitrification treatment so as to achieve stable operation of the nitrification system. The nitrified leachate is introduced into the anaerobic ammonium oxidation reactor 6, and the ammonium nitrogen removal process without additional energy consumption is realized by the anaerobic ammonium oxidization bacteria with the nitrified nitrite and residual ammonia nitrogen as matrix. After being treated by anaerobic ammonium oxidation UF membrane filter 8, one part of the leachate is refluxed to the A tank of the A/O reactor 4 for further reducing residual ammonia nitrogen and nitrate, and the other part is followed by the NF membrane filter 9, so as to achieve efficient and stable treatment for the wastewater with high organic matter and high ammonia nitrogen.

In the anaerobic reactor 3, a HRT is 12 d, a temperature is 37° C., a MLSS is 18 g/L, and a pH is 8.5.

In the A tank of A/O reactor 4, a HRT is 12 h, a pH is 8.5, a temperature is 37° C., a DO is 1.0 mg/L, and a MLSS is 30 g/L. In the O tank, a HRT is 6 d, a pH is 8.5, a temperature is 37° C., a DO is 4 mg/L, and a MLSS is 30 g/L. For the process of nitrification, in addition to above controlling through parameters, the O tank is provided with a nitrite online monitoring instrument, which monitors the nitrite nitrogen in real time to further control the specific process of the reaction. The concentration level of the nitrite nitrogen is controlled to be 55% of TN, and the ratio between nitrite and ammonia nitrogen that are to be introduced the anaerobic ammonium oxidation reactor 6 is controlled at 1.1:1.

The reflux ratio of the nitrification UF membrane filter 5 is controlled at 1000%, and is mixed with a part of the effluent of the anaerobic ammonium oxidation cycle unit to enter the A tank.

For the control parameters of the anaerobic ammonium oxidation reactor 6, a SRT is 15 d, a MLSS is 20 g/L, and a temperature is 37° C.

After the anaerobic ammonium oxidation reactor 6 performs treatment, a part of the supernatant after anaerobic ammonium oxidation by the UF membrane filter 8 has to be refluxed to the A tank in the A/O reactor 4, and mixed with a part of the effluent of the anaerobic ammonium oxidation cycle unit for entering the A tank, with the reflux ratio controlled at 150%. The concentrated liquid filtered by the anaerobic ammonium oxidation UF membrane filter 8 is refluxed to the front segment of the anaerobic ammonium oxidation reactor 6 for being mixed with the effluent of the nitrification UF membrane filter 5, with the reflux ratio controlled at 1000%.

The above description of the embodiments is intended to facilitate the understanding and use of the present invention by those skilled in the art. It will be apparent to those skilled in the art that various modifications can be readily made to these embodiments and the general principles described herein can be applied to other embodiments without the inventive work. Therefore, the present invention is not limited to the embodiments described above, and those skilled in the art should be able to make modifications and changes within the scope of the present invention without departing from the scope of the present invention.

What is claimed is:

1. A carbon removal and denitrification treatment device for a leachate from a waste incineration plant, the carbon removal and denitrification treatment device comprising a pretreatment unit, an anaerobic reactor, a nitrification cycle unit, an anaerobic ammonium oxidation cycle unit, and an NF membrane filter that are sequentially communicated with each other, wherein the nitrification cycle unit includes an A/O reactor in communication with the anaerobic reactor, and the anaerobic ammonium oxidation cycle unit includes an anaerobic ammonium oxidation reactor in communication with the nitrification cycle unit; a denitrification cycle assembly is disposed between an inlet end of the A/O reactor and an outlet end of the anaerobic ammonium oxidation cycle unit, and the inlet end of the A/O reactor is in communication with the outlet end of the anaerobic ammonium oxidation cycle unit through the denitrification cycle assembly.

2. The carbon removal and denitrification treatment device for the leachate from the waste incineration plant according to claim 1, wherein the pretreatment unit includes a sedimentation tank, and a conditioning tank disposed between the sedimentation tank and the anaerobic reactor.

3. The carbon removal and denitrification treatment device for the leachate from the waste incineration plant according to claim 1, wherein the nitrification cycle unit further includes a nitrification UF membrane filter disposed between the A/O reactor and the anaerobic ammonium oxidation cycle unit, a nitrification cycle line disposed between an outlet end of the nitrification UF membrane filter and the A/O reactor, and a nitrification cycle pump disposed on the nitrification cycle line.

4. The carbon removal and denitrification treatment device for the leachate from the waste incineration plant according to claim 3, wherein the anaerobic ammonium oxidation cycle unit further includes an anaerobic ammonium oxidation UF membrane filter disposed between the anaerobic ammonium oxidation reactor and the NF membrane filter, and the anaerobic ammonium oxidation UF membrane filter is provided with an inlet end in communication with the anaerobic ammonium oxidation reactor, a clear liquid outlet end in communication with the NF membrane filter, and a concentrated liquid outlet end; an anaerobic ammonium oxidation cycle line is disposed between the concentrated liquid outlet end and an inlet end of the anaerobic ammonium oxidation reactor, the anaerobic ammonium oxidation cycle line is provided with an anaerobic ammonia oxidation cycle pump, and the anaerobic ammonium oxidation reactor is in communication with the nitrification UF membrane filter.

5. The carbon removal and denitrification treatment device for the leachate from the waste incineration plant according to claim 1, wherein the denitrification cycle assembly includes a nitrogen removal circulation line that communicates with an inlet end of the nitrification cycle unit and the outlet end of the anaerobic ammonium oxidation cycle unit, and a denitrification cycle pump disposed on the denitrification cycle line.

6. A carbon removal and denitrification treatment method for the leachate based on the carbon removal and denitrification treatment device for the leachate from the waste incineration plant according to claim 1, the method comprising steps of:
1) pre-treating the leachate in the pretreatment unit to obtain a pre-treated leachate;
2) introducing the pretreated leachate into the anaerobic reactor to remove an organic matter to obtain an anaerobic-reacted leachate, and generate a biogas;
3) introducing the anaerobic-reacted leachate into the nitrification cycle unit to remove the residual organic matter, and adjusting a ratio of an ammonia nitrogen to a nitrite in the leachate;
4) cycling a part of an outlet material of the nitrification cycle unit back to the A/O reactor, and cycling the other part back to the anaerobic ammonium oxidation cycle unit to remove the ammonia nitrogen; and
5) cycling a part of an outlet material of the anaerobic ammonium oxidation cycle unit back to an inlet end of the anaerobic ammonium oxidation cycle unit, and cycling the other part back to the inlet end of the A/O reactor, and filtering the rest through the NF membrane filter for discharging.

7. The carbon removal and denitrification treatment method for the leachate based on the carbon removal and denitrification treatment device for the leachate from the waste incineration plant according to claim 6, wherein in the anaerobic reactor, a HRT is 5-12 d, a temperature is 33-37° C., a MLSS is 8-18 g/L, and a pH is 7.5-8.5.

8. The carbon removal and denitrification treatment method for the leachate based on the carbon removal and denitrification treatment device for the leachate from waste incineration plant according to claim 6, wherein the A/O reactor includes an A tank and an O tank that are in communication with each other, and in the A tank, a HRT is 6-12 h, a pH is 7.0-8.5, a temperature is 30-37° C., a DO is 0.2-1.0 mg/L, and a MLSS is 10-30 g/L; in the O tank, a HRT is 3-6 d, a pH is 7.0-8.5, a temperature is 30-37° C., a DO is 1-4 mg/L, a MLSS is 10-30 g/L, and a TN is 45%-55%, a ratio of nitrite to ammonia nitrogen in the outlet material of the nitrification cycle unit being 0.8-1.1:1.

9. The carbon removal and denitrification treatment method for the leachate based on the carbon removal and denitrification treatment device for the leachate from the waste incineration plant according to claim 6, wherein a reflux ratio of the cycling to the A/O reactor in the outlet material of the nitrification cycle unit is 500-1000%, a reflux ratio of the cycling to the inlet end of the anaerobic ammonium oxidation cycle unit in the outlet material of the anaerobic ammonium oxidation cycle unit is 500-1000%, and a reflux ratio of the cycling to the A/O reactor in the outlet material of the anaerobic ammonium oxidation cycle unit is 100-150%.

10. The carbon removal and denitrification treatment method for the leachate based on the carbon removal and denitrification treatment device for the leachate from the waste incineration plant according to claim 6, wherein in the anaerobic ammonium oxidation reactor, a SRT is 6-15 d, a MLSS is 8-20 g/L, and a temperature is 30-37° C.

* * * * *